United States Patent
Kfir et al.

(10) Patent No.: US 6,996,125 B2
(45) Date of Patent: Feb. 7, 2006

(54) METHOD AND DEVICE FOR DELIVERING COMMUNICATION IN ETHERNET-OVER-SYNCHRONOUS NETWORKS

(75) Inventors: Asher Kfir, Givat-Shmuel (IL); Idan Kaspit, Rosh Ha'ayin (IL); Yoav Valadarsky, Kfar Saba (IL)

(73) Assignee: ECI Telecom Ltd., Petach Tikva (IL)

( * ) Notice: Subject to any disclaimer, the term of this patent is extended or adjusted under 35 U.S.C. 154(b) by 828 days.

(21) Appl. No.: 09/865,557

(22) Filed: May 29, 2001

(65) Prior Publication Data

US 2002/0181499 A1 Dec. 5, 2002

(30) Foreign Application Priority Data

May 17, 2001 (IL) ..................................... 143195

(51) Int. Cl.
*H04L 12/64* (2006.01)
(52) U.S. Cl. ...................................... 370/466; 370/474
(58) Field of Classification Search ................ 370/465, 370/466, 474, 476, 358; 709/230, 246, 249
See application file for complete search history.

(56) References Cited

U.S. PATENT DOCUMENTS

| | | | | |
|---|---|---|---|---|
| 6,014,708 A | * | 1/2000 | Klish | 709/232 |
| 6,172,990 B1 | | 1/2001 | Deb et al. | |
| 6,414,966 B1 | * | 7/2002 | Kulkarni et al. | 370/465 |
| 6,496,519 B1 | * | 12/2002 | Russell et al. | 370/465 |
| 6,584,118 B1 | * | 6/2003 | Russell et al. | 370/466 |

FOREIGN PATENT DOCUMENTS

EP 1006751 A2 * 6/2000

OTHER PUBLICATIONS

Jones et al., "A Justification for a Variable Bandwidth Allocation methodology for SONET Virtually SPEs", *Contributions to T1 Standards Projects—T1X1.5*, (2000), pp. 1-4.
Jones et al., "A Proposed Link Capacity Adjustment Scheme (LCAS) for SONET Virtually Concatenated SPEs", *Contribution to T1 Standards Project—T1X1.5*, (2000), pp. 1-30.
Jones et al., "Higher order SONET Virtual Concatenation", *Contribution to T1 Standards Project—T1X1.5*, (2000), pp. 1-3.
"Power Driver Generates 3-φ Controls to Bridge Motors, DSPs", *Electronic Design Product Features*, pp. 41-42, (2001).

* cited by examiner

*Primary Examiner*—Ricky Ngo
*Assistant Examiner*—Duc Duong
(74) *Attorney, Agent, or Firm*—Browdy and Neimark, PLLC

(57) ABSTRACT

A method for enabling provision of service-levels in an Ethernet-over-synchronous communication network, by:
  receiving Ethernet frames at an input rate;
  mapping the Ethernet frames into a synchronous protocol;
  generating a pause signal after a received amount of Ethernet frames reaches or exceeds a threshold capacity level, the pause signal being generated in accordance with a service-level agreement (SLA) determining an output rate based upon an aggregate rate enabled by K memory containers out of N available memory containers, where K and N are integers; and
  outputting the mapped data frames from the K memory containers thereby providing synchronous transmissions at the output rate.

14 Claims, 4 Drawing Sheets

METHOD AND DEVICE FOR DELIVERING COMMUNICATION IN ETHERNET-OVER-SYNCHRONOUS NETWORKS

FIELD OF THE INVENTION

The present invention relates generally to Ethernet communication networks and more particularly to Ethernet networks that operate over synchronous communication networks.

BACKGROUND OF THE INVENTION

The evolvement of Business-to-Business (B2B) communication created a demand for implementation of Ethernet networks in market niches that require communication over distances that are longer than conventional distances associated with local-are-network (LAN) applications for which Ethernet was originally conceived. Bit-rate requirements have also increased in view of such demand thus creating a demand for Gigabit Ethernet networks that operate over synchronous communication networks, with 10 Gigabit Ethernet networks being currently under development.

Various companies have developed integrated circuits that are intended to perform various functions in Gigabit Ethernet networks. For example, in an Internet publication dated Jan. 31, 2001, CoreEl Microsystems describes its CS-1002 implementation of Gigabit Ethernet auto negotiation function for its 1000B-X Corecell device. In another Internet publication dated Jan. 31, 2001, CoreEl Microsystems describes its CS-1003 core for flow control for its full duplex mode Corecell device.

Some aspects of technologies and related art are described in the following publications:

a contribution T1X1.5/2000-157R1 dated Jul. 10-14, 2000 of Lucent Technologies to the T1 Standards Project—T1X1.5 which proposes a justification for a variable bandwidth allocation (VBA) methodology for SONET virtually concatenated SPEs (SPE—Synchronous Payload Envelope);

a contribution T1X1.5/1999-098 dated Apr. 9, 1999 of Lucent Technologies to the T1 Standards Project—T1X1.5 which describes higher order SONET virtual concatenation;

a contribution T1X1.5/2000-199 dated Oct. 9–13, 2000 of Lucent Technologies to the T1 Standards Project—T1X1.5 which describes a proposed link capacity adjustment scheme (LCAS) for SONET virtually concatenated SPEs;

an article entitled "FPGAs Deliver Key Stages For 10-Gbit Ethernet", by Ray Weiss in *Electronic Design*, Jan. 22, 2001, pp. 41–42; and U.S. Pat. No. 6,172,990 to Deb et al that describes methods and apparatus for processing packet data received from a physical layer.

The disclosures of all references mentioned above and throughout the present specification are hereby incorporated herein by reference.

SUMMARY OF THE INVENTION

The present invention seeks to enable provision of service-levels in an Ethernet-over-synchronous communication network without necessitating involvement of an Ethernet router/switch in the provision of the service-levels.

There is thus provided in accordance with a preferred embodiment of the present invention a method for enabling provision of service-levels in an Ethernet-over-synchronous communication network, the method including receiving Ethernet frames at an input rate, mapping the Ethernet frames into a synchronous protocol thereby producing mapped data frames suitable for transmission in the synchronous protocol, generating a pause signal after a received amount of the Ethernet frames reaches or exceeds a threshold capacity level, the pause signal being generated in accordance with a service-level agreement (SLA) determining an output rate based upon an aggregate rate enabled by K memory containers out of N available memory containers, where K and N are integers, and outputting the mapped data frames from the K memory containers thereby providing synchronous transmissions at the output rate.

Preferably, the generating includes preventing transmission of the Ethernet frames at a capacity that reaches or exceeds a capacity allowed by the SLA.

The Ethernet-over-synchronous communication network preferably includes at least one of the following: Ethernet-over-SONET, and Ethernet-over-SDH network. The input rate preferably includes one of the following: a rate of 1 gigabit per sec, a rate of 10 gigabit per sec, a rate of 100 megabit per sec, and a rate of 10 megabit per sec.

Preferably, the generating includes dynamically generating the pause signal in accordance with an SLA provisioned or determined in real-time.

Further preferably, the generating includes determining K that is required for supporting the SLA, and selecting the K.

There is also provided in accordance with a preferred embodiment of the present invention apparatus for enabling provision of service-levels in an Ethernet-over-synchronous communication network, the apparatus including an Ethernet receiving buffer operative to receive Ethernet frames at an input rate, mapping circuitry operatively associated with the Ethernet receiving buffer and operative to map the Ethernet frames into a synchronous protocol thereby producing mapped data frames suitable for transmission in the synchronous protocol, a plurality of memory containers N operatively associated with the mapping circuitry, a controller operatively associated with the N memory containers and the mapping circuitry and operative to generate a pause signal after the Ethernet receiving buffer is filled by an amount of the Ethernet frames that reaches or exceeds a threshold capacity level, the pause signal being generated in accordance with a service-level agreement (SLA) determining an output rate based upon an aggregate rate enabled by the K memory containers, and a synchronous output buffer operatively associated with the controller and the N memory containers and operative to output the mapped data frames from the K memory containers under control of the controller thereby providing synchronous transmissions at the output rate.

Preferably, the controller is also operative to prevent transmission of the Ethernet frames at a capacity that reaches or exceeds a capacity allowed by the SLA. The controller is also preferably operative to dynamically select the K out of the N memory containers and to dynamically generate the pause signal in accordance with an SLA provisioned or determined in real-time.

Preferably, the threshold capacity level is lower than the entire capacity of the Ethernet receiving buffer.

Further in accordance with a preferred embodiment of the present invention there is provided an Ethernet-over-synchronous communication system including an Ethernet interface operative to provide Ethernet frames generated by a service provider at an input rate, a synchronous mapper operatively associated with the Ethernet interface and including N memory containers, the mapper being operative to convert the Ethernet frames at the input rate into mapped data frames in a synchronous protocol at an output rate which is an aggregate rate enabled by K out of the N memory containers that are loaded with the mapped data frames, and a synchronous network operatively associated with the synchronous mapper and operative to receive from the mapper the mapped data frames from the K memory containers and to transmit the mapped data frames in a synchronous transmission at the output rate to a customer.

Preferably, the output rate is determined by an SLA through a selection of K.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
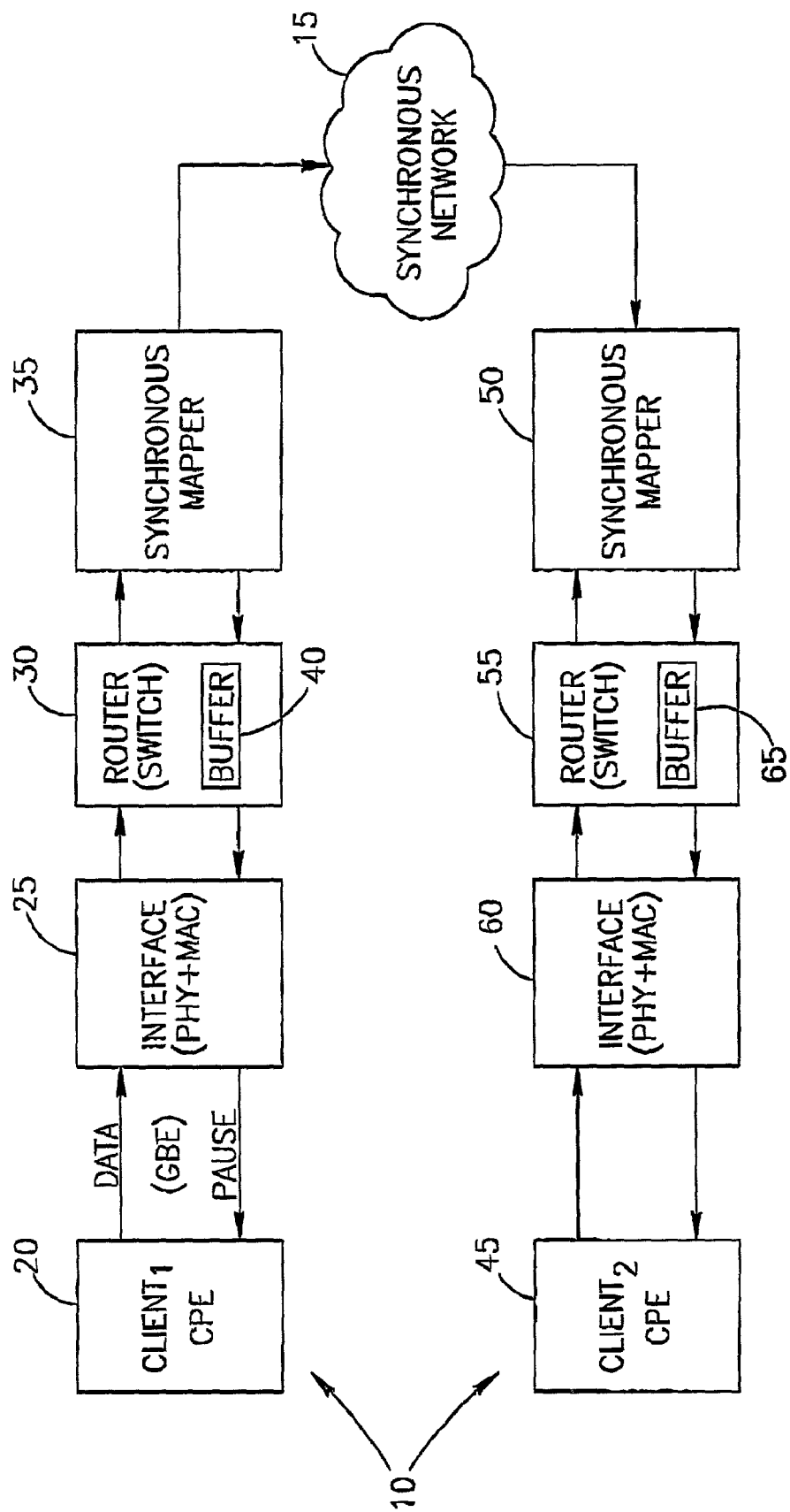
FIG. 1 is a simplified block diagram illustration of a prior art Gigabit Ethernet-over-synchronous communication system.

Reference is now made to FIG. 1 which is a simplified block diagram illustration of a prior art Gigabit Ethernet-over-synchronous communication system 10.

The system 10 enables a first client ($client_1$) to communicate Ethernet frames with a second client ($client_2$) in duplex or half-duplex communication via a synchronous network 15, such as a synchronous optical network (SONET) or a network based on synchronous digital hierarchy (SDH). The system 10 typically serves a plurality of clients, and the first client and the second client are two of the plurality of clients that can communicate with each other.

In the system 10, customer premises equipment (CPE) 20 of the $client_1$ provides data and control information to and receives data and control information from an interface 25 in a Gigabit Ethernet (GBE) format. The interface 25 typically includes a physical layer interface as well as a media-access-control (MAC) interface (both not shown).

The interface 25 typically communicates with the synchronous network 15 via an Ethernet router/switch 30 and a synchronous mapper 35. The Ethernet router/switch 30 typically includes a buffer 40 which participates in performance of flow control operations for matching GBE communication with synchronous communication carried over the synchronous network 15, and for increasing the supported delays in the network 10. The delays supported in the network 10 result from buffering implemented for conversion of synchronous communication into GBE communication, such conversion being used, as is well known in the art, for extending a useful range of GBE communication through mapping of GBE frames into synchronous transmissions that can be communicated over long distances.

The Ethernet router/switch 30 performs switching and routing operations to direct the data and the control information transmitted by the $client_1$ CPE 20 to a $client_2$ CPE 45 that is addressed by the $client_1$ CPE 20. The Ethernet router/switch 30 provides the data and control information in the GBE format to the mapper 35 which maps the data and the control information into a synchronous protocol, such as a SONET protocol or an SDH protocol, and provides mapped data frames to the synchronous network 15.

The mapped data frames are then provided from the synchronous network 15 to a synchronous mapper 50 at the $client_2$ side. The mapper 50 maps the mapped data frames back into data and control information in the GBE format. The data and control information in the GBE format are then provided to a router/switch 55 that switches the data and the control information in the GBE format to the $client_2$ CPE 45 via an interface 60 that is typically similar in structure and functionality to the interface 25.

The router/switch 55 is typically similar in structure to the router/switch 30. The functionality of the router/switch 55 in a direction from the $client_2$ to the $client_1$ is similar to the functionality of the router/switch 30 in a direction from the $client_1$ to the $client_2$. Similarly, the functionality of the router/switch 55 in a direction from the $client_1$ to the $client_2$ is similar to the functionality of the router/switch 30 in a direction from the $client_2$ to the $client_1$. In each of the router/switch 30 and 55, the functionality in the ingress is not necessarily identical to functionality in the egress. The router/switch 55 typically includes a buffer 65 that is similar in structure and functionality to the buffer 40.

Communication in a direction from the $client_2$ to the $client_1$ is typically performed in a manner similar to communication from the $client_1$ to the $client_2$, and the operation of the $client_2$ CPE 45, the interface 60, the router/switch 55, and the mapper 50 in communication from the $client_2$ to the $client_1$ is similar to the operation of the $client_1$ CPE 25, the interface 25, the router/switch 30, and the mapper 35 in communication from the $client_1$ to the $client_2$ respectively.

In communication in a direction from the $client_1$ to the $client_2$, flow control at the $client_1$ side is provided by the Ethernet router/switch 30 that uses flow control circuitry such as the one described in CoreE1 Microsystems's CS-1003 core in association with the buffer 40. The router/switch 30 typically generates a pause signal that is transmitted to the $client_1$ CPE 20 in order to instruct the $client_1$ CPE 20 to stop sending data. The $client_1$ CPE 20, in response to reception of the pause signal, stops sending data to the router/switch 30.

At the $client_2$ side, flow control is provided by the $client_2$ CPE 45 that uses flow control circuitry such as the one described in CoreE1 Microsystems's CS-1003 core in association with the buffer 65. The $client_2$ CPE 45 generates a pause signal that is transmitted to the router/switch 55 in order to instruct the router/switch 55 to stop sending data. The router/switch 55, in response to reception of the pause signal, stops sending data to the $client_1$ CPE 20.

Flow control at both the $client_1$ side and the $client_2$ side in communication in a direction from the $client_2$ to the $client_1$ is typically performed in a manner similar to the flow control in communication in the direction from the $client_1$ to the $client_2$.

Figure 2:
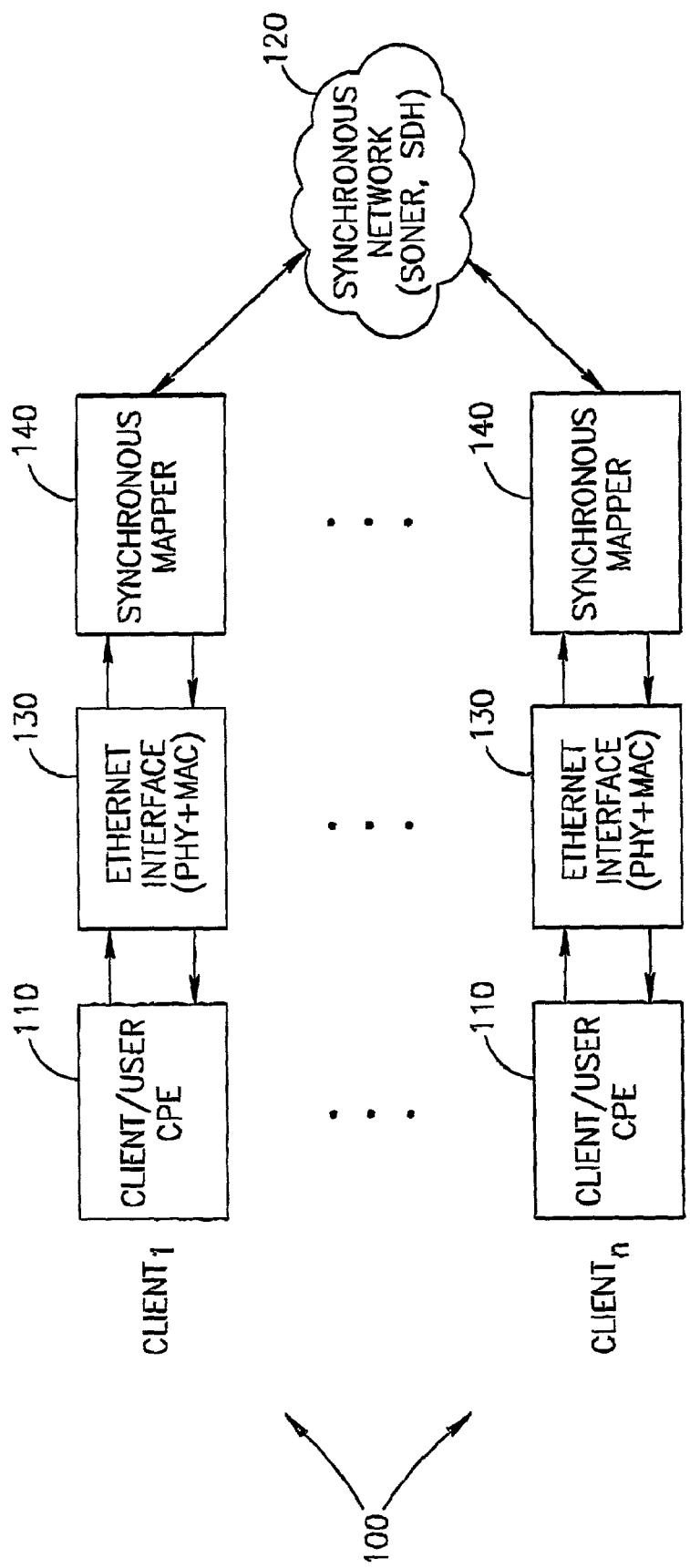
FIG. 2 is a simplified block diagram illustration of an Ethernet-over-synchronous communication system constructed and operative in accordance with a preferred embodiment of the present invention.

Reference is now made to FIG. 2 which is a simplified block diagram illustration of an Ethernet-over-synchronous communication system 100 constructed and operative in accordance with a preferred embodiment of the present invention.

Preferably, the system 100 enables provision of various service-levels without necessitating involvement of an Ethernet router/switch in the provision of service-levels. Thus, the system 100 may be operative without an Ethernet router/switch.

The system 100 preferably includes a plurality of client/user CPEs 110 that are capable of communicating in two-way communication via a synchronous network 120, such as a SONET or a network based on the SDH protocol. The term "client/user CPE" is used throughout the specification and claims to refer to service provider equipment or customer equipment.

Each of the plurality of client/user CPEs 110 is operatively associated with the synchronous network 120 via an Ethernet interface 130 and a synchronous mapper 140. Each Ethernet interface 130 may be similar in structure and functionality to the interface 25 of FIG. 1 and may similarly include a physical layer interface and a media access card (MAC) (both not shown).

Since the system 100 may be operative without a router/switch, a point-to-point two-way communication path must be established by a network management system (not shown) in order to enable communication between two predetermined client/user CPEs 110. Alternatively or additionally, the network management system may establish a broadcast link for enabling a client/user CPE 110 to broadcast information to at least two client/user CPEs 100. However, for simplicity, the description below refers to an example in which the client/user CPE 110 of client$_1$ communicates with the client/user CPE 110 of client$_m$ in two-way communication. Thus, a point-to-point communication path is established between the client/user CPE 110 of client$_1$ and the client/user CPE 110 of client$_m$. Yet it is appreciated that this example is not to be considered as limiting, and any two of the plurality of client/user CPEs 110 may alternatively communicate with each other.

Referring, for example and without limiting the description, to the client/user CPE 110 of client$_1$ as a service provider and to the client/user CPE 110 of client$_m$ as a customer, the system 100 preferably enables communication from the service provider to the customer at a rate defined by a predetermined service-level agreement (SLA). It is appreciated that although the CPEs of the service provider and the customer may be similar, the service provider may typically include a server that pushes information to clients, and the customer may typically include a local-area-network (LAN) server that receives the information from the service provider and provides the information to a plurality of end users of a LAN served thereby.

It is appreciated that one of the most important parameters defined by a service-level agreement is a rate of data provided to a customer by a service provider. In the present invention, the service provider may provide various service-levels with discrete output data rates as described herein below.

The term "service-level agreement" (SLA) is used throughout the specification and claims to refer to an agreement reached typically between a provider of communication facilities and a client and defines a service-level to be used for communication to and from the client, where the client may be at least one of the following: the service provider; the customer; a cluster including the service provider and the customer; and any predetermined group of clients. The service-level determined in such a service-level agreement specifies, inter alia, at least one of the following: a predetermined communication rate; a time schedule of communication rates in which different communication rates may be applied; a predetermined pricing schedule for communication services during specified time periods which enable a combination of different communication rates during specified time periods; and a criterion that determines, inter alia, a communication rate.

Preferably, the service provider generates data and control information in an Ethernet format at an input rate, and provides Ethernet frames at the input rate to the Ethernet interface 130 and the mapper 140 associated therewith. The mapper 140 preferably maps the Ethernet frames into a synchronous protocol thereby providing mapped data frames at an output rate that is determined by the SLA.

The input rate is a constant input rate that is typically used in Ethernet communications such as, but not limited to, one of the following rates: a rate of 1 gigabit per sec; a rate of 10 gigabit per sec; a rate of 100 megabit per sec; and a rate of 10 megabit per sec. However, as described herein below with reference to FIG. 3, a mechanism that is operative to prevent throwing away of data frames which is preferably implemented in the system 100 may preferably be used to stop input of data for predetermined time periods. The constant input rate is therefore interrupted from time to time, and data is not transmitted during interrupt periods thereby resulting in an actual input rate, also referred to as an average input rate, which is typically lower than or equal to the input rate. The output rate may preferably be lower than the average input rate, or equal to the average input rate when output overhead is discarded.

Figure 3:
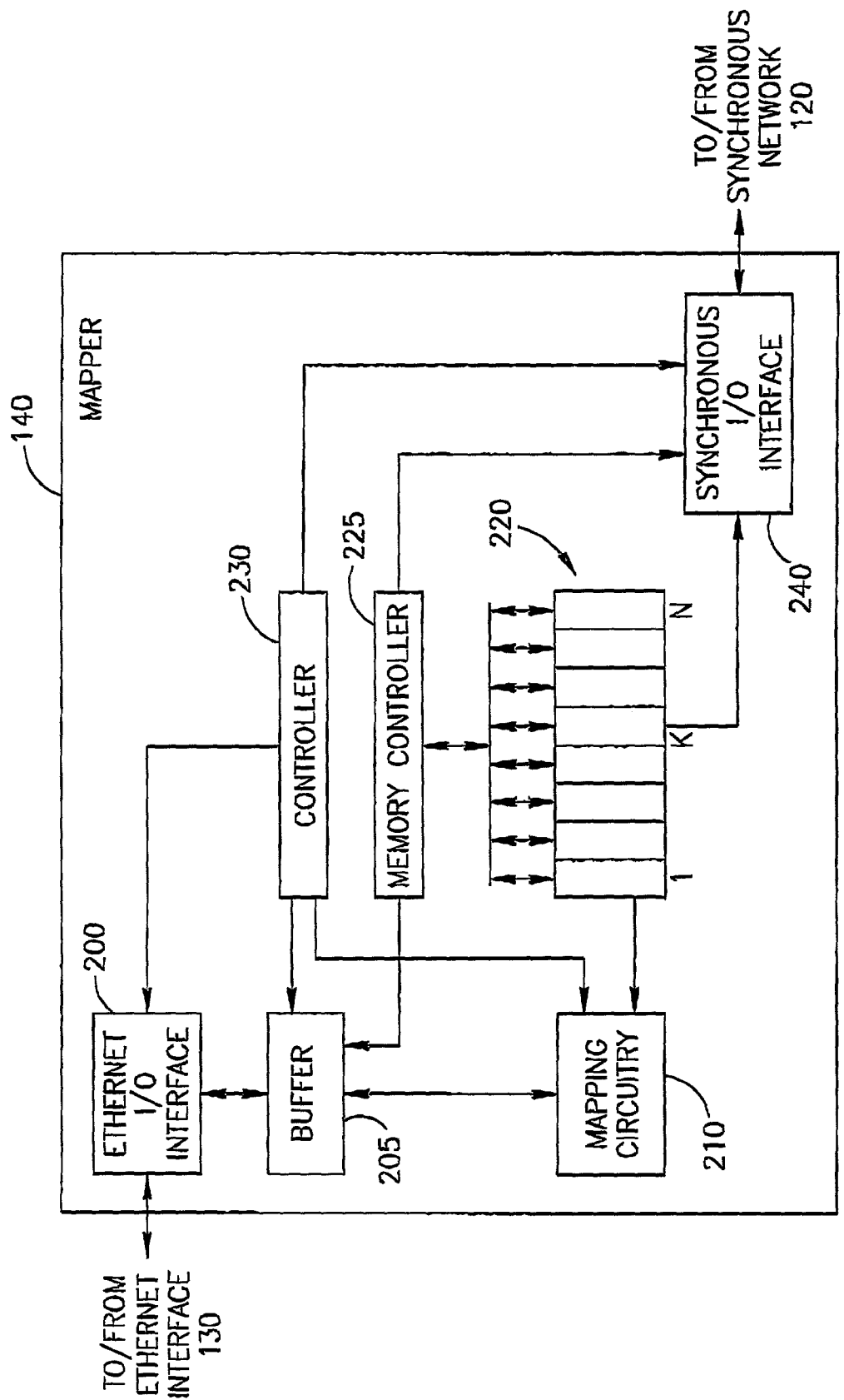
FIG. 3 is a simplified block diagram illustration of a synchronous mapper in the system of FIG. 2.

Reference is now additionally made to FIG. 3 which is a simplified block diagram illustration of the synchronous mapper 140 which is at a side of the service provider in the system 100 of FIG. 2. It is appreciated that the synchronous mapper 140 at a side of the customer may preferably be similar in structure and functionality to the synchronous mapper 140 at the service provider side.

Preferably, the mapper 140 includes the following units: an Ethernet input/output (I/O) interface 200; a buffer 205; mapping circuitry 210; N memory containers 220 where N is an integer; a memory controller 225; a controller 230; and a synchronous I/O interface 240.

The Ethernet I/O interface 200 preferably receives the Ethernet frames generated at the service provider side from the Ethernet interface 130. The interface 200 preferably provides the Ethernet frames via the buffer 205 to the mapping circuitry 210 which is preferably operative to map the Ethernet frames into a synchronous protocol that is used in the synchronous network 120, such as a SONET protocol or an SDH protocol.

The mapping circuitry 210 may preferably include conventional mapping circuitry for synchronous communication. The mapping circuitry 210 preferably produces mapped data frames suitable for transmission in the synchronous protocol that is used by the synchronous network 120. It is appreciated that a mapping method used by the mapping circuitry 210 may be predetermined or determined in real-time. A suitable mapping method may include, for example, mapping by using the high-level data link control (HDLC) protocol but it is appreciated that other mapping methods may alternatively be employed.

Preferably, the mapping circuitry 210 loads the mapped data frames into the memory containers 220 under control of the memory controller 225 and/or the controller 230. The memory controller 225 or the controller 230 preferably generates a pause signal when the buffer 205 is filled by an amount of data that reaches or exceeds a threshold capacity level. The threshold capacity level may preferably be a predetermined capacity level that is typically lower than the entire capacity of the buffer 205.

It is appreciated that the data in the buffer 205 exceeds the threshold capacity level when the average input rate is greater than the output rate which is determined by a number K of memory containers 220 out of the N memory containers 220, where K≦N. The K memory containers are preferably allocated to the Ethernet interface 130 according to the SLA.

Preferably, the memory controller 225 or the controller 230 may determine K either a priori or dynamically in accordance with a SLA that may respectively be determined a priori or dynamically. Generation of the pause signal is preferably operative to prevent throwing away of data frames when the average Ethernet input rate reaches or exceeds an output rate permitted by the SLA.

It is appreciated that although pause signals are known to be generated for flow control purposes in systems that do not support different SLAs, the present invention provides for generation of different time-distributions of pause signals, where each time-distribution of pause signals results from a selection of a specific SLA.

The output rate is therefore obtained by a multiplication of K by a rate enabled by a single memory container 220. Accordingly, the output rate can be obtained only as one of a discrete amount of rates ranging from the rate enabled by a single memory container 220 to a rate enabled by a multiplication of N by the rate enabled by a single memory container 220. The SLA can also therefore determine only a rate that is one of the discrete amounts of rates mentioned above.

There are many types of memory containers, each memory container type being typically characterized by a rate enabled thereby. For example, a VC4 container (VC—Virtual Container) enables a rate of 149,760 kilobit per second (KBit/sec) and a VC3 container enables a rate of 48,384 KBit/sec. However, it is appreciated that the rate enabled by each memory container may vary according to the mapping method selected.

Preferably, the pause signal is transmitted via the Ethernet interface 130 to the service provider in order to instruct the service provider to stop sending data to the customer. The service provider, in response to reception of the pause signal, preferably stops sending data to the customer. Transmission of the pause signals is thus preferably operative to prevent throwing away of data frames by interrupting data transmission throughout periods assigned by a pause signal, referred to as pause periods, thereby determining the average input rate that may be greater than or preferably equal to the output rate.

Preferably, the K memory containers 220 provide the mapped data frames to the synchronous I/O interface 240 which preferably outputs the mapped data frames from the K memory containers 220 under control of the controller 230 thereby providing to the synchronous network 120 synchronous transmissions at the output rate.

Figure 4:
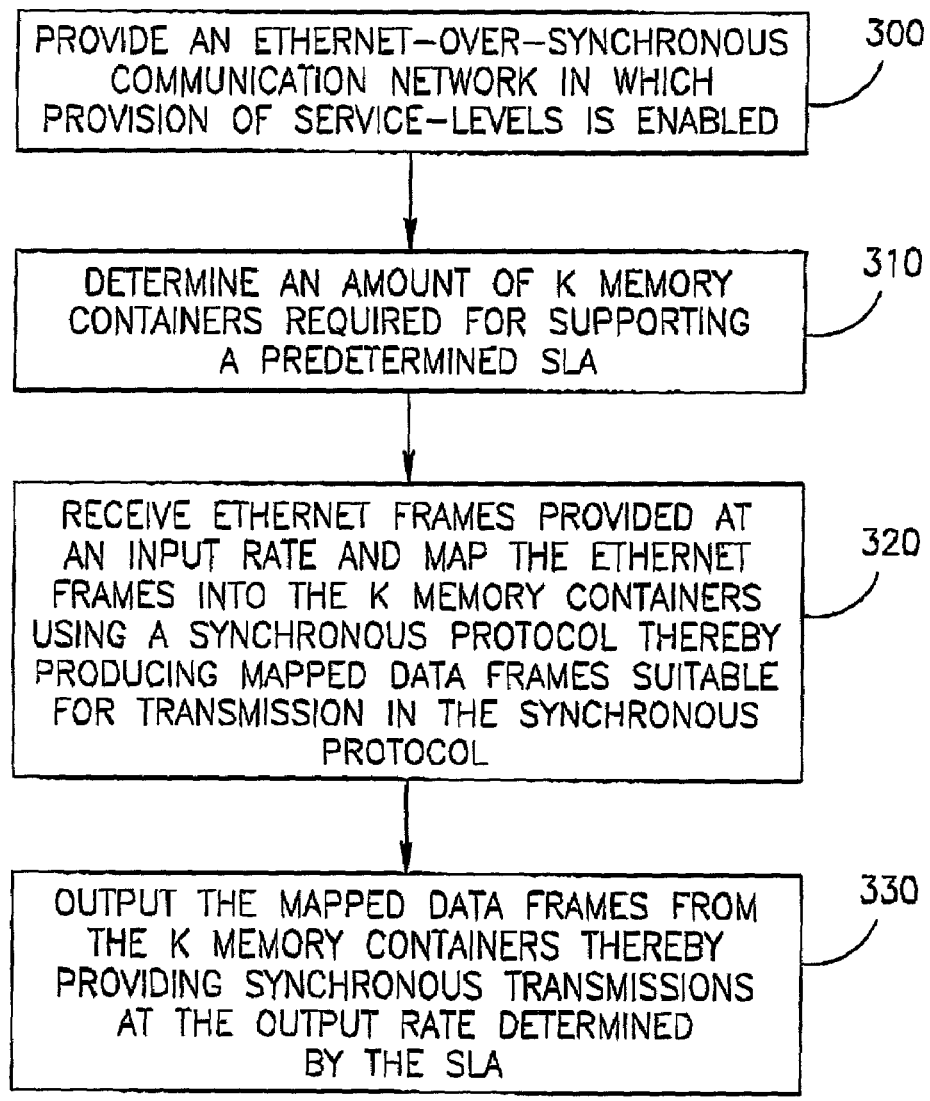
FIG. 4 is a simplified flowchart illustration of a preferred method of operation of the apparatus of FIGS. 2 and 3.

Reference is now made to FIG. 4 which is a simplified flowchart illustration of a preferred method of operation of the apparatus of FIGS. 2 and 3.

An Ethernet-over-synchronous communication network is preferably provided in which provision of service-levels is enabled (step 300). The Ethernet-over-synchronous communication network may preferably include at least one of the following: Ethernet-over-SONET; and Ethernet-over-SDH network. The Ethernet-over-synchronous communication network may operate, for example, at one of the following input rates: a rate of 1 gigabit per sec; a rate of 10 gigabit per sec; a rate of 100 megabit per sec; and a rate of 10 megabit per sec.

Preferably, an amount of memory containers K that is required for supporting a SLA is determined (step 310). It is appreciated that a selection of K may be predetermined or performed dynamically in accordance with a SLA that may dynamically be determined in real-time.

Preferably, Ethernet frames that are provided at an input rate are received and mapped into the K memory containers using a synchronous protocol thereby producing mapped data frames suitable for transmission in the synchronous protocol (step 320). Then, the mapped data frames from the K memory containers are preferably outputted to provide synchronous transmissions at the output rate determined by the SLA (step 330).

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the claims that follow:

What is claimed is:

1. A method for enabling provision of service-levels in an Ethernet-over-synchronous communication network, the method comprising:

receiving Ethernet frames at an input rate;

mapping said Ethernet frames into a synchronous protocol thereby producing mapped data frames suitable for transmission in said synchronous protocol;

generating a pause signal after a received amount of said Ethernet frames reaches or exceeds a threshold capacity level, said pause signal being generated in accordance with a service-level agreement (SLA) determining an output rate based upon an aggregate rate enabled by K memory containers out of N available memory containers, where K and N are integers, wherein each memory container enables a given rate and the output rate is one of a plurality of discrete rates and is equal to the given rate multiplied by K; and outputting the mapped data frames from the K memory containers thereby providing synchronous transmissions at said output rate.

2. The method according to claim 1 and wherein said generating step comprises preventing transmission of said Ethernet frames at a capacity that reaches or exceeds a capacity allowed by the SLA.

3. The method according to claim 1 and wherein said Ethernet-over-synchronous communication network comprises at least one of the following: Ethernet-over-SONET; and Ethernet-over-SDH network.

4. The method according to claim 1 and wherein said input rate comprises one of the following: a rate of 1 gigabit per sec; a rate of 10 gigabit per sec; a rate of 100 megabit per sec; and a rate of 10 megabit per sec.

5. The method according to claim 1 and wherein said generating step comprises dynamically generating the pause signal in accordance with an SLA provisioned or determined in real-time.

6. The method according to claim 1 and wherein said generating step comprises determining K that is required for supporting said SLA; and selecting said K.

7. Apparatus for enabling provision of service-levels in an Ethernet-over-synchronous communication network, the apparatus comprising:

an Ethernet receiving buffer operative to receive Ethernet frames at an input rate;

mapping circuitry operatively associated with the Ethernet receiving buffer and operative to map the Ethernet frames into a synchronous protocol thereby producing mapped data frames suitable for transmission in said synchronous protocol;

a plurality of memory containers N operatively associated with the mapping circuitry;

a controller operatively associated with the N memory containers and the mapping circuitry and operative to generate a pause signal after said Ethernet receiving buffer is filled by an amount of said Ethernet frames that reaches or exceeds a threshold capacity level, said pause signal being generated in accordance with a service-level agreement (SLA) determining an output rate based upon an aggregate rate enabled by said K memory containers; and a synchronous output buffer operatively associated with said controller and said N memory containers and operative to output the mapped data frames from the K memory containers under control of the controller thereby providing synchronous transmissions at said output rate, wherein each memory container enables a given rate and the output rate is one of a plurality of discrete rates and is equal to the given rate multiplied by K.

8. The apparatus according to claim 7 and wherein said controller is also operative to prevent transmission of said Ethernet frames at a capacity that reaches or exceeds a capacity allowed by the SLA.

9. The apparatus according to claim 7 and wherein said Ethernet-over-synchronous communication network comprises at least one of the following: Ethernet-over-SONET; and Ethernet-over-SDH network.

10. The apparatus according to claim 7 and wherein said input rate comprises one of the following: a rate of 1 gigabit per sec; a rate of 10 gigabit per sec; a rate of 100 megabit per sec; and a rate of 10 megabit per sec.

11. The apparatus according to claim 7 and wherein said controller is operative to dynamically select said K out of the N memory containers and to dynamically generate the pause signal in accordance with an SLA provisioned or determined in real-time.

12. The apparatus according to claim 7 and wherein said threshold capacity level is lower than the entire capacity of said Ethernet receiving buffer.

13. An Ethernet-over-synchronous communication system comprising:

an Ethernet interface operative to provide Ethernet frames generated by a service provider at an input rate;

a synchronous mapper operatively associated with the Ethernet interface and including N memory containers, said mapper being operative to convert said Ethernet frames at the input rate into mapped data frames in a synchronous protocol at an output rate which is an aggregate rate enabled by K out of the N memory containers that are loaded with said mapped data frames, and to generate a pause signal after a received amount of said Ethernet frames reaches or exceeds a threshold capacity level, said pause signal being generated in accordance with a service-level agreement (SLA) determining said output rate, and wherein each memory container enables a given rate and the output rate is one of a plurality of discrete rates and is equal to the given rate multiplied by K; and a synchronous network operatively associated with the synchronous mapper and operative to receive from the mapper said mapped data frames from said K memory containers and to transmit said mapped data frames in a synchronous transmission at said output rate to a customer.

14. The system according to claim 13 and wherein said output rate is determined by an SLA through a selection of K.

* * * * *